United States Patent [19]

Grube et al.

[11] Patent Number: 5,235,631
[45] Date of Patent: Aug. 10, 1993

[54] TRUNKED TALK-GROUP ASSIGNMENT METHOD

[75] Inventors: Gary W. Grube, Palatine; David J. Ness-Cohn, Lisle; Ted A. Kozlowski, Chicago, all of Ill.

[73] Assignee: Motorola, Inc., Schaumburg, Ill.

[21] Appl. No.: 387,036

[22] Filed: Jul. 31, 1989

[51] Int. Cl.$^5$ .......................................... H04M 11/00
[52] U.S. Cl. ...................................... 379/58; 379/62
[58] Field of Search ...................... 379/59, 60, 63, 58; 455/33.1

[56] References Cited

U.S. PATENT DOCUMENTS

| | | | |
|---|---|---|---|
| 4,646,345 | 2/1987 | Zdunek et al. | 379/62 |
| 4,712,229 | 12/1987 | Nakamura | 379/58 |
| 4,723,264 | 2/1988 | Sasuta et al. | 379/58 |

Primary Examiner—Jin F. Ng
Assistant Examiner—William D. Cumming
Attorney, Agent, or Firm—Timothy W. Markison; Steven G. Parmelee

[57] ABSTRACT

A trunked communication system having reassignable talk-groups. By having the talk-groups reassignable, the trunked communication system can accommodate a large number of user groups without adding to the control resource traffic congestion.

15 Claims, 4 Drawing Sheets

TRUNKED TALK-GROUP ASSIGNMENT METHOD

TECHNICAL FIELD

The present invention relates generally to trunked communication systems and in particular to such systems wherein specialized but temporary group assignments of subscriber units may be effected as needed.

BACKGROUND OF THE ART

It is generally well known that a trunked communication system may efficiently assign a limited number of communication resources among a plurality of subscriber units. In a typical trunked communication system, a communication resource controller controls, via a control resource, the allocation of the communication resources among a plurality of subscriber units are generally organized into fleets, subfleets or groups, and individuals.

U.S. Pat. No. 4,723,264, issued to Sasuta et al. and assigned to Motorola Inc., is entitled "Signalling Method for Establishing Trunked Communication". It discloses a method for allocating the limited number of communication resources among the subscriber units utilizing only the subscriber unit's individual identification code. To allocate a communication resource, the requesting subscriber unit transmits an inbound signalling word (ISW) to the communication resource controller. The ISW contains the requesting subscriber unit's individual identification code and an operation code. The communication resource controller decodes the ISW and, using a talk-group table, extracts the requesting subscriber unit's talk-group affiliation. After verifying the requesting subscriber unit's talk-group affiliation, the communication resource controller links the requesting subscriber unit to the talk-group wherein, an available communication resource will be allocated to the requesting subscriber unit.

If the requesting subscriber unit's affiliation is not known, the communication resource controller commands the requesting subscriber unit to transmit a talk-group affiliation prior to having access to the trunked system. Also, a subscriber unit can change its talk-group affiliation by transmitting a new talk-group affiliation to the communication resource controller prior to sending an ISW requesting access to a communication resource. This method allows a substantial increase in the number of subscriber units that may access a single trunked system without adding to the control resource traffic congestion.

In the Sasuta patent, each talk-group is preassigned and stored in the communication resource controller and generally organized in a talk-group table. A subscriber unit requesting access to one of the limited number of communication resources is limited to selecting an affiliation with one of the preassigned talk-groups. This, however, may well become a serious limitation when the number of needed talk-groups exceeds the capacity of the talk-group table.

For example, an airport using a trunked communication system employing the techniques of the Sasuta patent may well support only two airlines. Typically, an airline's flights are numbered from 0 to 1,999, thus requiring 2,000 preassigned talk-groups to accommodate their flight schedule. By requiring each flight, or each user-group, to have a preassigned talk-group, a trunked communication system is substantially limited, especially when only a small number of flights would be accessing the trunked communication system at any given time.

One alternative to accommodating a large number of user-groups would be to increase the number of preassignable talk-groups. This alternative would increase the number of talk-groups, or, from the example, would allow the trunked communication system to accommodate more than two airlines; however, this is not without costs. By increasing the number of talk-groups, or adding more bits to the talk-group table, subscriber units designed to operate in conjunction with smaller talk-group tables would not be compatible. Also, this alternative would require more signalling time to send the extra bits, thus adding to the control resource traffic congestion.

Therefore, a need exists for a trunked communication system that provides for a large number of user-groups, without requiring a larger talk-group table, and that does not increase the signalling time of the trunked communication system and does not substantially add to the control resource traffic congestion.

SUMMARY OF THE INVENTION

These needs and others are substantially met by the trunked talk-group assignment method discussed herein. The method comprises the steps of: sending a user-group affiliation request; processing the user-group affiliation request; and assigning one of a predetermined number of talk-groups to the user-group.

In one embodiment, a user operating one of the plurality of subscriber units sends a subscriber unit individual identification code (user ID) and a user-group to the communication resource controller. Once received, the communication resource controller verifies the user ID and checks to see if the user-group has been assigned a talk-group. If the user-group has not been assigned a talk-group, the communication resource controller assigns an available talk-group to the user-group. If all of the talk-groups are assigned to user-groups, the communication resource controller will send a rejection message to the user indicating that all of the talk-groups are actively assigned to user-groups.

Once the user-group has been assigned a talk-group, the communication resource controller links, or affiliates, the user to that talk-group. After being linked, the user transmits a communication resource access request to the communication resource controller. If the request is valid and a communication resource is available, the communication resource controller grants the user access to one of the limited number of communication resources. Having access to a communication resource, the user can communicate to any of the subscriber units linked to the same talk-group.

Once a user-group, having an assigned talk-group, has become inactive for a predetermined period of time, the communication resource controller erases the talk-group assignment. Prior to erasing the talk-group assignment, the communication resource controller checks to see if any of the linked subscriber units will need the talk-group assignment. If the talk-group is needed, the assignment will not be erased.

BEST MODE FOR CARRYING OUT THE INVENTION

Figure 1:
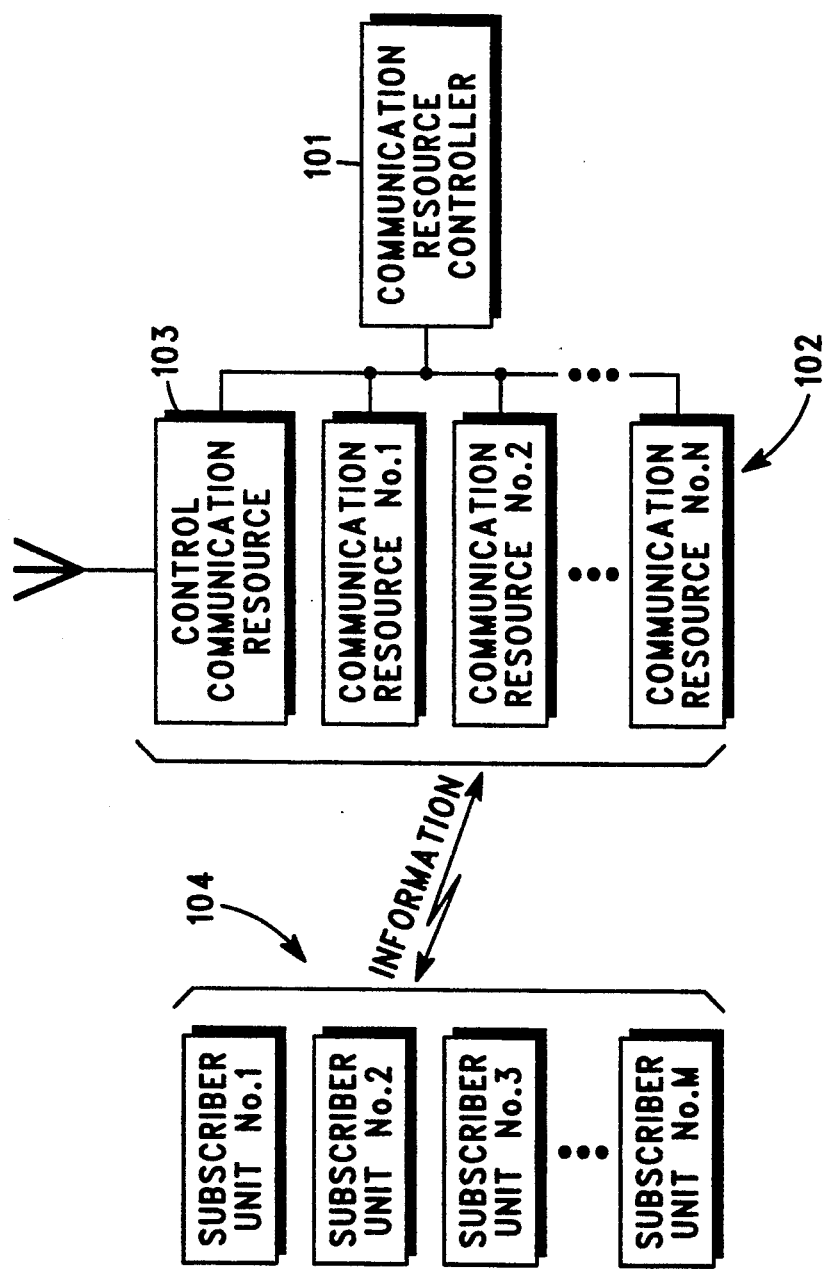
FIG. 1 illustrates a block diagram of a trunked communication system which may operate in accordance with the present invention.

FIG. 1 illustrates a trunked communication system (100) comprising a communication resource controller (101), a limited number of communication resources (102) (shown are n number of communication resources), a control resource (103), and a plurality of subscriber units (104) (shown are m number of subscriber units, where m may be a substantially larger number than n). Each of the subscriber units (104) and the communication resource controller (101) comprise computer platforms that are utilized in prior art systems such as Smartnet and Syntor X, which are available from Motorola, Inc., and are readily programmable to operate as described herein.

Generally, to access one of the communication resources (102), a user operating one of the plurality of subscriber units (104) sends a user-group affiliation, or assignment, request to the communication resource controller (101). The controller (101) receives the user-group affiliation request via the control resource (103) and processes it. If the user-group affiliation request is valid, the controller (101) assigns one of the predetermined number of talk-groups to the user-group requested by the user, and affiliates, or links, the user (104) to the assigned talk-group. Being linked to a talk-group, the user (104) sends a communication resource access request to the controller (101). If the communication resource access request is valid and a communication resource (102) is available, the controller (101) will assign the available communication resource to the user (104). When the user-group becomes inactive for a predetermined period of time, or is no longer needed, the controller (101) erases the talk-group assignment.

Figure 2:
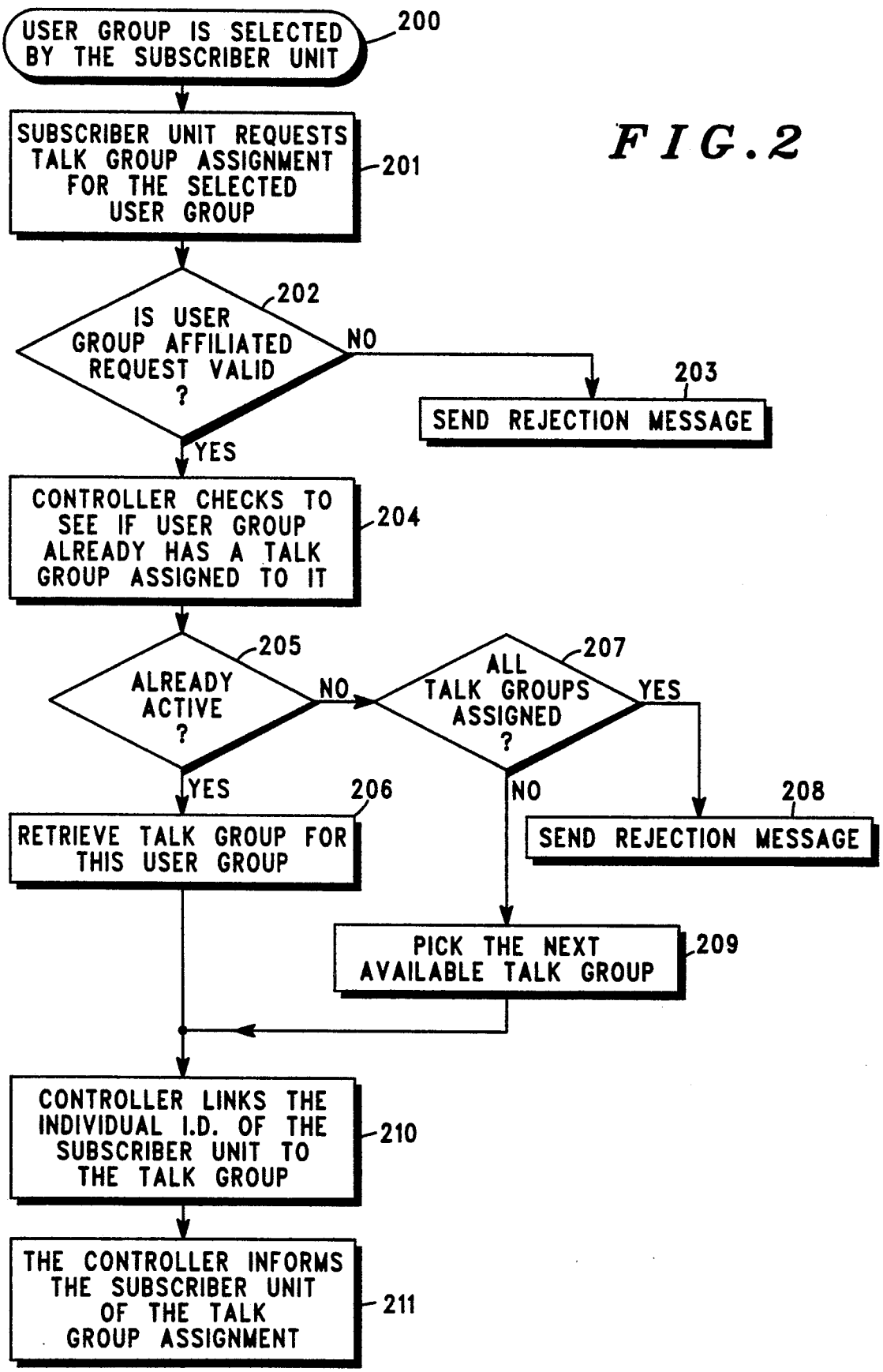
FIG. 2 illustrates a flow chart of the talk-group assignment process in the system of FIG. 1.

If the trunked communication system (100) is used by an airport, for example, the user (104) can access one of the limited number of communication resources (102) by entering a user-group as illustrated in FIG. 2 (200). The user-group may be any combination of alphanumerics which can be represented in binary form. For example, the user (104) may enter a user-group of ZZ1999 which would then represent airline ZZ and flight number 1999. By using this combination of alphanumerics, two letters and four digits, there are 6,760,000 possible user-groups, or airline/flight, combinations. In contrast, typical trunked communication systems that employ the teaching of the Sasuta patent have 4096 preassigned user-groups.

Having selected a user-group (200), the user (104) sends a user-group assignment, or affiliation, request to the controller (101) (201). The user-group affiliation request typically comprises a subscriber unit individual identification code (user ID), a binary representation of the user-group, and a request to assign or affiliate the user-group with one of a predetermined number of talk-groups. After receiving the user-group assignment request, the controller (101) checks the user ID to verify that the user (104) is a valid subscriber unit (202). If the user ID is invalid, the controller (101) sends a rejection message to the user (104) and stops processing the request (203). If the user ID is valid, the controller (101) checks to see if the user group, in this example ZZ1999, has been assigned a talk-group (204). If the user group ZZ1999 is actively assigned to a talk-group (205), the talk-group assignment is retrieved or retime stamped (206), and the user (104) is affiliated with the assigned talk-group (210). The term "actively assigned" means that the user-group has already been assigned a talk-group and there are subscriber units affiliated with the assigned talk-group, or the user-group has been used within the past x minutes. (Note that the x minutes could be fractions of a minute, several hours, or even days, and is predetermined based on the requirements of the trunked communication system (100).) Once the user (104) has been assigned a talk-group, the controller (101) notifies the user (104) of its affiliation (211).

If the user-group ZZ1999 is not actively assigned a talk-group (205), the controller (101) assigns the next available talk-group to the user-group (209) and affiliates the user with the newly assigned talk-group (210). If all the talk-groups are assigned to user-groups (207), the controller (101) will send a rejection message indicating that no talk-groups are available (208). Once the user (104) has been affiliated, or linked, with a talk-group, the controller (101) stores the affiliation and notifies the user (104) of its affiliation (211). The controller (101) stores the user ID of each of the subscriber units, the talk-group affiliation of each subscriber unit, and the assignment of talk-groups to user-groups. Thus, for the this example, the controller (101) stores the user-group ZZ1999 assignment to a talk-group, and stores the user (104) affiliation to the talk-group assigned to ZZ1999. By having this information stored, the controller (101) can readily recognize active talk-groups and subscriber unit affiliations.

If the user (104) does not receive a response from the communication resource controller (101), it will continually send the talk-group assignment request until the controller (101) responds or until a retry mechanism is exhausted. A response could be a talk-group assignment, a rejection message for an invalid user ID, a rejection message indicating that all talk-groups are actively assigned to user-groups, or a rejection when the user is not allowed access to a particular user-group.

The user (104) can change user-groups at any time by entering a new user-group. For example, if the user (104) wishes to be affiliated with flight QQ0000, he enters this new user group, QQ0000, and the above process is repeated.

Figure 3:
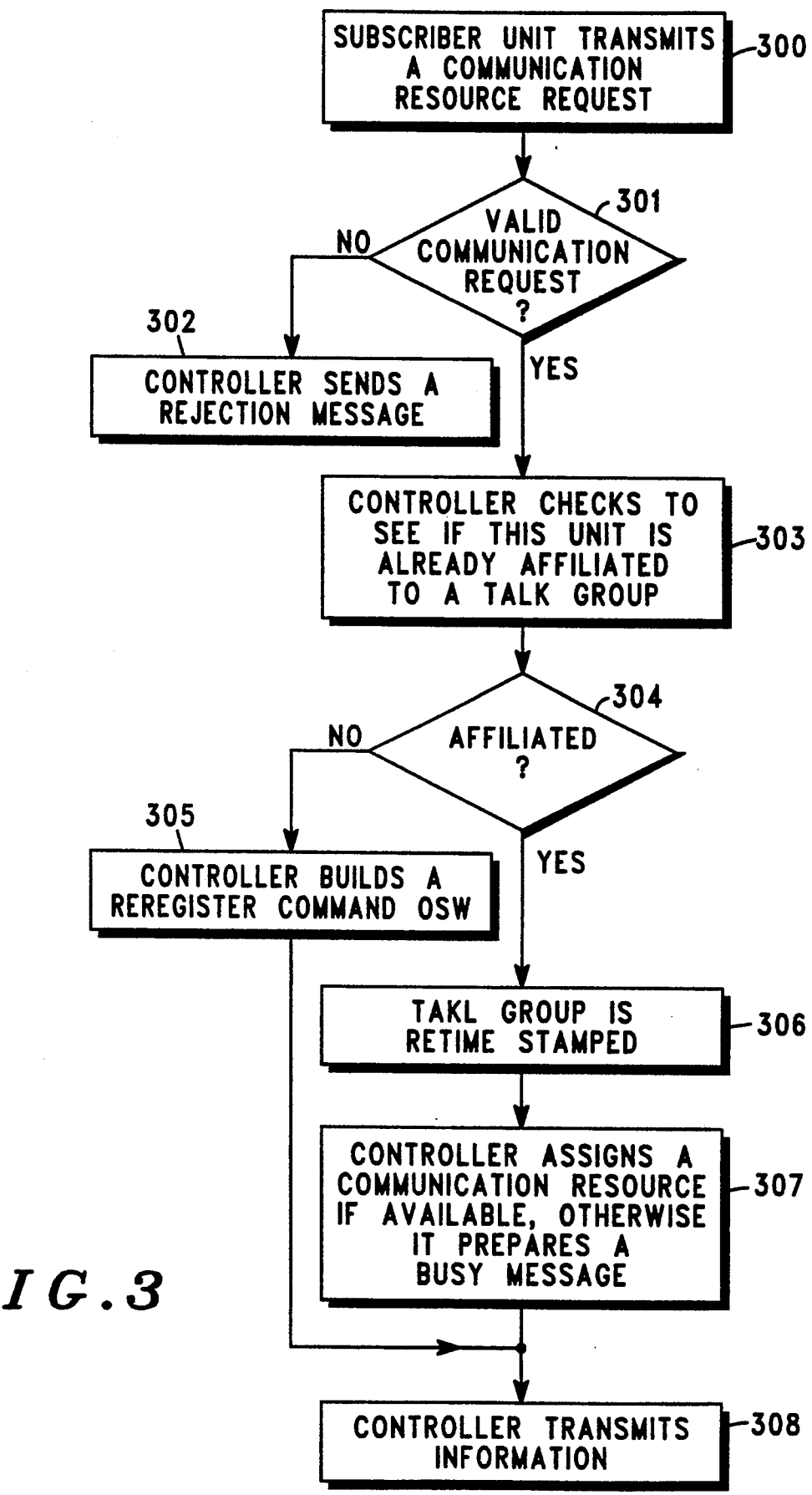
FIG. 3 illustrates a flow chart of the communication resource access process in the system of FIG. 1.

Once the user-group ZZ1999 has been assigned a talk-group, the user (104) sends a communication resource access request to the controller (101) as illustrated in FIG. 3 (300). The communication resource access request can be sent by pressing the microphone push-to-talk button. The communication resource access request typically comprises the user ID and a request to grant the user access to one of the communication resources (102). After receiving the communication resource access request, the controller (101) verifies that the user (104) is a valid subscriber unit (301) and verifies that the user (104) is affiliated with a talk-group (303). If the user (104) is invalid, the controller (101) sends a rejection message to the user (104) (302). If the user (104) is not affiliated with a talk-group (304), the controller (101) sends an outbound signalling word (OSW) to the user (104) requesting the user (104) to enter a user-group (305). If the user (104) is affiliated with a talk-group (304), the talk-group is re-time stamped (306). Time stamping will be discussed below.

Having verified the user ID and the user's talk-group affiliation, the controller (101) creates a communication resource assignment OSW and sends it to all the subscriber units affiliated with the same user-group, ZZ1999. If a communication resource is available, the communication resource assignment OSW informs the affiliated subscriber units which communication resource will be used (307 & 308). The communication resource assignment OSW typically contains the communication resource number and the assigned talk-group number. If a communication resource is not available, the communication resource OSW informs the user (104) that all communication resources are busy (307 & 308). Typically, if all the communication resources (102) are busy, the user's communication resource request will be placed in a queue awaiting the next available communication resource (102).

Having access to a communication resource (102), the user (104) being at least part of the user-group, in this example ZZ1999, is able to communicate with all subscriber units affiliated to the same talk-group. In a sense, the talk-group has been given the name of the user-group, thus for the remainder of this example, the user-group and assigned talk-group will be used interchangeably. Communication between the subscriber units (104) affiliated with the same user-group can be conducted by conventional trunking techniques using talk-groups, or fleets and subfleets, and affiliations.

Figure 4:
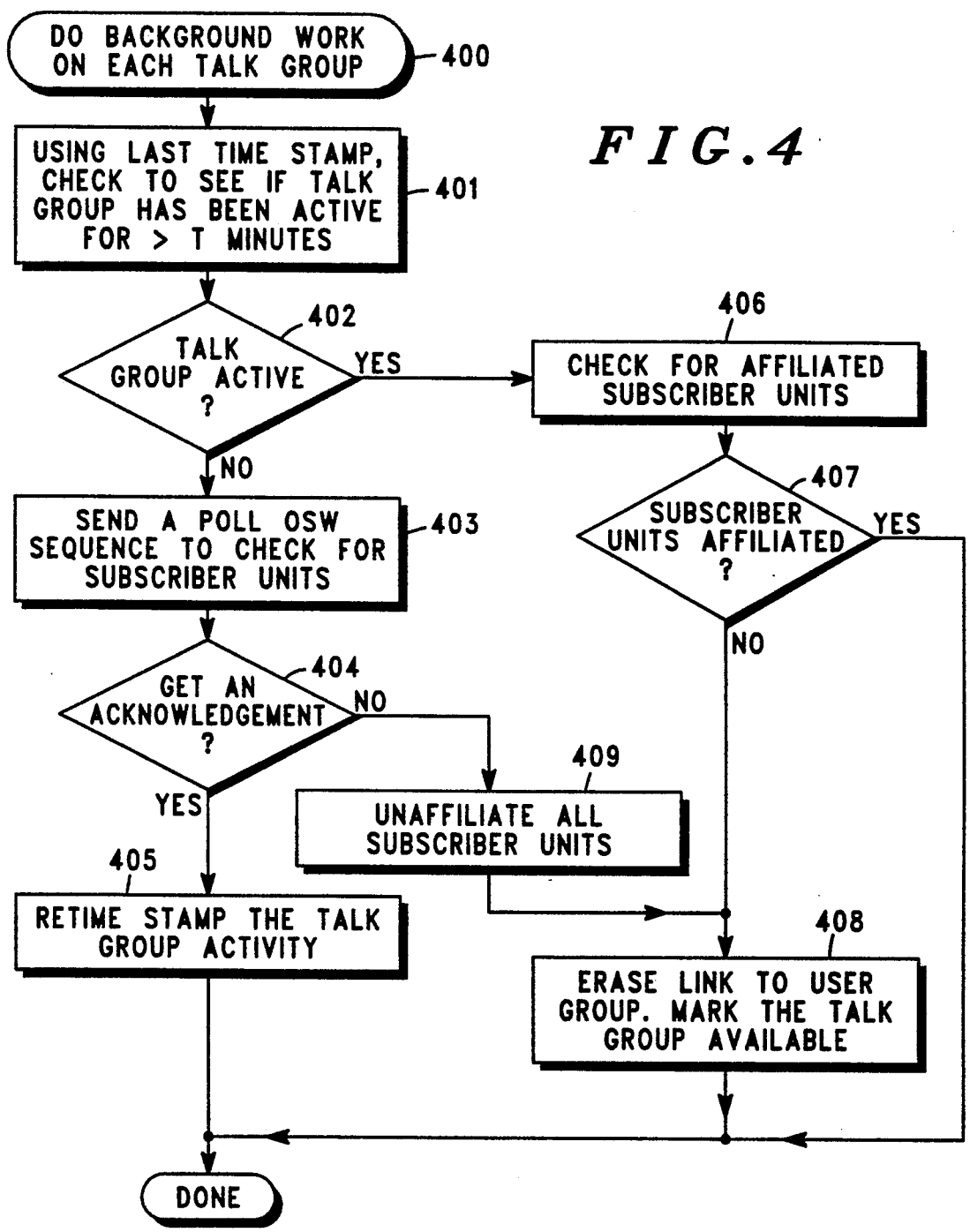
FIG. 4 illustrates a flow chart of the talk-group assignment erasing process in the system of FIG. 1.

Once a user-group has been assigned a talk-group, the controller (101) continually monitors the activity of the talk-group assigned to a user-group as illustrated in FIG. 4 (400). For every signal, requesting either to be affiliated with a user-group or to gain access to a communication resource (102), the assigned talk-group is re-time stamped (400). Time stamping resets or initiates a clock, or some similar device, which is used to measure the time between user-group activities. The controller (101) continually, or periodically, monitors the clock for each assigned talk-group to determine if a predetermined period of time has elapsed (401). If the predetermined period of time has elapsed (402) without talk-group activity, the controller (101) transmits a poll OSW to determine if any of the subscriber units (104) want the user-group, in this example ZZ1999, to remain active (403).

If the controller (101) does not receive an acknowledgement, or a re-time stamping signal, from at least one of the subscriber units (104) that user-group ZZ1999 is needed (404), the controller (101) unaffiliates all the subscriber units affiliated with user-group ZZ1999 (409), erases the talk-group assignment to user-group ZZ1999, and marks the talk-group available such that it may be assigned to a new user-group (408). If the controller (101) does receive an acknowledgement that the user-group ZZ1999 is needed (404), the talk-group assigned to user-group ZZ1999 is retime stamped (405).

If the predetermined period of time has not elapsed (402), the controller (101) determines if any subscriber units (104) are affiliated with a user-group, in this example ZZ1999 (406). If there are no subscriber units affiliated with user-group ZZ1999 (407), the talk-group assignment is erased and the talk-group is marked available for re-assignment (408). If there are subscriber units affiliated with user-group ZZ1999 (407), the activity monitoring process starts over again.

Another method for relinquishing, or erasing, the talk-group assignment is to have the subscriber units (104) automatically transmit a re-time stamping signal. This eliminates the need for the controller (101) to send out a polling OSW. The subscriber units (104), however, would not necessarily have to reaffiliate over a fixed time. A system status OSW could be sent to indicate how often a subscriber unit (104) must auto-affiliate when it is operating in a user-group. The subscriber units (104) also could be required to reset their auto-affiliation timer in response to receiving an affiliation OSW from any member of the user-group. This would reduce the number of subscriber unit's auto-affiliations to one, reducing the control resource traffic significantly.

Throughout this section, the trunked communication system (100) was presented through an airlines example. This was done for illustrative purposes only. The present invention works equally well for any trunked communication system that utilizes talk-groups, where talk-groups are the fleets, subfleets, or groups assignments of the subscriber units (104). By having the talk-groups assignable, a large number of user-groups can be serviced from one trunked communication system (100), especially when all the user-groups are not required, or needed, to be active at the same time.

What is claimed is:

1. In a trunked communication system having, at least, a plurality of subscriber units, a limited number of communication resources, a communication resource controller, a predetermined number of assignable talk groups, and substantially more user groups than the predetermined number of assignable talk groups, wherein the communication resource controller allocates the limited number of communication resources among at least one of the plurality of subscriber units when the at least one of the plurality of subscriber units is affiliated with one of the predetermined number of assignable talk groups, a method for affiliating a subscriber unit of the plurality of subscriber units to one of the predetermined number of assignable talk groups, the method comprises the steps of:
   a) transmitting, by a subscriber unit, a user group assignment request that includes a selected user group of the user groups;
   b) determining whether the selected user group is actively assigned to one of the predetermined number of assignable talk groups;
   c) when the selected user group is not actively assigned to one of the predetermined number of assignable talk groups, determining whether at least one of the predetermined number of assignable talks groups is not actively assigned to a user group to produce at least one available talk;
   d) when the at least one available talk group exists, temporarily assigning the selected user group to one of the at least one available talk group to produce an assigned talk group; and
   e) temporarily affiliating the subscriber unit to the assigned talk group.

2. The method of claim 1 wherein step (b) further comprises verifying the user-group affiliation request and sending a user-group affiliation rejection message when the user-group affiliation request is invalid.

3. The method of claim 1 further comprises the steps of:
   f) sending, by the subscriber unit, a communication resource access request;
   g) verifying the communication resource access request;

h) allocating one of the limited number of communication resources to the subscriber unit when at least one of the limited number of communication resources is available; and i) sending a busy message when all of the limited number of communication resources are allocated.

4. The method of claim 3 wherein step (g) further comprises sending a communication resource access rejection message when the communication resource access request is invalid.

5. The method of claim 1 further comprises the steps of erasing the assignment of the assigned talk group to the selected user group when the user group is inactive.

6. The method of claim 5 wherein the erasing step further comprises the sub steps of:
 1) determining whether the user group has been active within a predetermined period of time;
 2) requesting, after the predetermined period of time has elapsed, an acknowledgement that the user group is still needed; and
 3) maintaining the assignment of the assigned talk group to the selected user group when the predetermined period of time has not elapsed or when at least one of the plurality of subscriber units has acknowledged that the user group is still needed.

7. The method of claim 5 wherein the erasing step further comprises the substeps of:
 1) determining whether any of the plurality of subscriber units are affiliated with the assigned talk group; and
 2) erasing the assignment of the assigned talk group to the selected user group when no subscriber units are affiliated with the assigned talk group, and maintaining the assignment of the assigned talk group to the selected user groups when at least one subscriber unit is affiliated with the assigned talk group.

8. In a trunked communication system having, at least, a plurality of subscriber units, a limited number of communication resources, a communication resource controller, a predetermined number of assignable talk groups, and substantially more user groups than the predetermined number of assignable talk groups, wherein the communication resource controller allocates the limited number of communication resources among at least one of the plurality of subscriber units when the at least one of the plurality of subscriber units is affiliated with one of the predetermined number of assignable talk groups, a method for a subscriber unit of the plurality of subscriber units to affiliate with one of the predetermined number of assignable talk groups, the method comprises the steps of:
 a) transmitting, by a subscriber unit, a user group assignment request that includes a selected user group of the user groups;
 b) receiving notification that the selected user group has been assigned to a talk group; and
 c) transmitting an acknowledgement that indicates that the assigned user group is still needed.

9. The method of claim 8 wherein step (c) further comprises transmitting a communication resource access request.

10. The method of claim 9 further comprises receiving access to one of the limited number of communication resources when the communication resource access request is valid and at least one of the communication resources is available.

11. In a trunked communication system having, at least, a plurality of subscriber units, a limited number of communication resources, a communication resource controller, a predetermined number of assignable talk groups, and substantially more user groups than the predetermined number of assignable talk groups, wherein the communication resource controller allocates the limited number of communication resources among at least one of the plurality of subscriber units only when the at least one of the plurality of subscriber units is affiliated with one of the predetermined number of assignable talk groups, a method for the communication resource controller to affiliate a subscriber unit of the plurality of subscriber units to one of the predetermined number of assignable talk groups, the method comprises the steps of:
 a) receiving a user group assignment request that includes a selected user group;
 b) determining whether the selected user group is actively assigned to one of the predetermined number of assignable talk groups;
 c) when the selected user group is not actively assigned to one of the predetermined number of assignable talk groups, determining whether at least one of the predetermined number of assignable talk groups is not available to produce at least one available talk group;
 d) when the at least one available talk group exists, assigning the selected user group to one of the at least one available talk group to produce an assigned talk group; and
 e) affiliating the subscriber unit to the assigned talk group.

12. The method of claim 11 wherein step (a) further comprises verifying that the user-group affiliation request is valid and sending a rejection message when the user-group affiliation request is invalid.

13. The method of claim 11 wherein step (c) further comprises sending a rejection message when all of the predetermined number of talk-groups are actively assigned.

14. The method of claim 11 further comprises erasing the assignment of the talk-group to the user-group when a predetermined period of time elapses.

15. The method of claim 11 wherein step (d) further comprises erasing the assignment of the talk-group to the user-group when none of the plurality of subscriber units are affiliated with the talk-group.

* * * * *